United States Patent
Kobayashi

(10) Patent No.: US 8,909,822 B2
(45) Date of Patent: Dec. 9, 2014

(54) OUTPUT DEVICE, LOG COLLECTING METHOD FOR OUTPUT DEVICE, AND STORAGE MEDIUM

(71) Applicant: Hiroshi Kobayashi, Kanagawa (JP)

(72) Inventor: Hiroshi Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 13/711,801

(22) Filed: Dec. 12, 2012

(65) Prior Publication Data
US 2013/0166791 A1 Jun. 27, 2013

(30) Foreign Application Priority Data
Dec. 26, 2011 (JP) ................................. 2011-282650

(51) Int. Cl.
*G06F 3/00* (2006.01)
*G06F 11/30* (2006.01)
*G06F 11/07* (2006.01)

(52) U.S. Cl.
CPC ........ *G06F 11/3051* (2013.01); *G06F 11/0733* (2013.01); *G06F 11/0787* (2013.01); *G06F 11/3034* (2013.01); *G06F 11/0769* (2013.01); *G06F 11/0784* (2013.01)

USPC ........................................................... 710/19

(58) Field of Classification Search
None
See application file for complete search history.

(56) References Cited

U.S. PATENT DOCUMENTS

| 5,309,251 A * | 5/1994 | Terajima ...................... 358/444 |
| 8,463,754 B2 * | 6/2013 | Murakami .................... 707/682 |
| 2010/0238487 A1 * | 9/2010 | Sekiya ......................... 358/1.15 |

FOREIGN PATENT DOCUMENTS

| JP | 2007-076334 | 3/2007 |
| JP | 2007-310827 | 11/2007 |
| JP | 2009-033539 | 2/2009 |

* cited by examiner

*Primary Examiner* — Idriss N Alrobaye
*Assistant Examiner* — Richard B Franklin
(74) *Attorney, Agent, or Firm* — Oblon, Spivak, McClelland, Maier & Neustadt, L.L.P.

(57) ABSTRACT

The purpose of this invention is to acquire log information of all System on Chips in an output device for debugging without having much effect on existing functions of the output device and conducting complicated steps. If a storage device preliminarily formatted with a predefined volume label is connected to the output device, log information read based on the same volume label as the volume label of the storage device is written to the storage device.

5 Claims, 4 Drawing Sheets

OUTPUT DEVICE, LOG COLLECTING METHOD FOR OUTPUT DEVICE, AND STORAGE MEDIUM

CROSS-REFERENCE TO RELATED APPLICATIONS

This patent application is based on and claims priority pursuant to 35 U.S.C. §119 to Japanese Patent Application No. 2011-282650, filed on Dec. 26, 2011, in the Japan Patent Office, the entire disclosure of which is hereby incorporated by reference herein.

BACKGROUND OF THE INVENTION

1. Field of the Invention

The present invention relates to an output device, a log collecting method for the output device, and a storage medium.

2. Description of the Related Art

Conventionally, in case failures occur in an output device such as a projector and an image forming apparatus, after storing operating information, status information, and error information as log information in the output device, a technology to collect the log information by using a dedicated tool on a terminal such as a personal computer (PC) and to extract the log information to removable media such as a Universal Serial Bus (USB) memory is well known.

For example, a technology to extract log information stored in an output device by using a dedicated tool to extract the log information and carrying out certain operations on a user interface (UI) including changing settings on the output device has been proposed (e.g., JP-2007-076334-A.)

Also, a technology to collect intended log information automatically by storing a log collecting definition file in an external medium and having an output device read the definition file has been proposed (e.g., JP-2007-310827-A and JP-2009-033539-A.)

However, with many conventional log collecting technologies the log acquisition process tends to be complicated due to the need for a dedicated tool to extract log information stored in the output device and the requirement to carry out a UI operation including changing of specific settings on the output device as proposed in JP-2007-076334-A. Also, in case an output device consists of a plurality of independent System On Chips (SoCs), it is necessary to acquire operating log information for each SoC by using different log information collecting methods or log collecting steps for each SoC.

Also, in the technologies proposed in JP-2007-310827-A and JP-2009-033539-A, although the log information collecting method described above can be simplified, it is necessary for the output device to check whether or not the definition file exists each time the external medium is connected regardless of executing collecting log information in the disclosed configuration. Therefore, it is highly possible to greatly affect existing functions of the output device itself since it takes time to check the log information if an external medium that includes many files is connected to the output device.

SUMMARY OF THE INVENTION

The present invention provides a novel output device, a log collecting method for the output device, and storage medium that minimizes impact on existing functions of the output device and facilitates collecting log information for debugging on all SoCs in the output device that consists of a plurality of SoCs without conducting complicated steps.

More specifically, the present invention provides an output device that writes log information read based on the same volume label as a predefined volume label to a storage medium if the storage medium preliminarily formatted with the predefined volume label is inserted into the output device.

The present invention provides an output device, a log collecting method for the output device, and storage medium that can acquire debug log information of all SoCs in the output device en bloc without conducting specified UI operations on the output device and having much effect on existing functions of the output device.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION OF THE INVENTION

Figure 1:
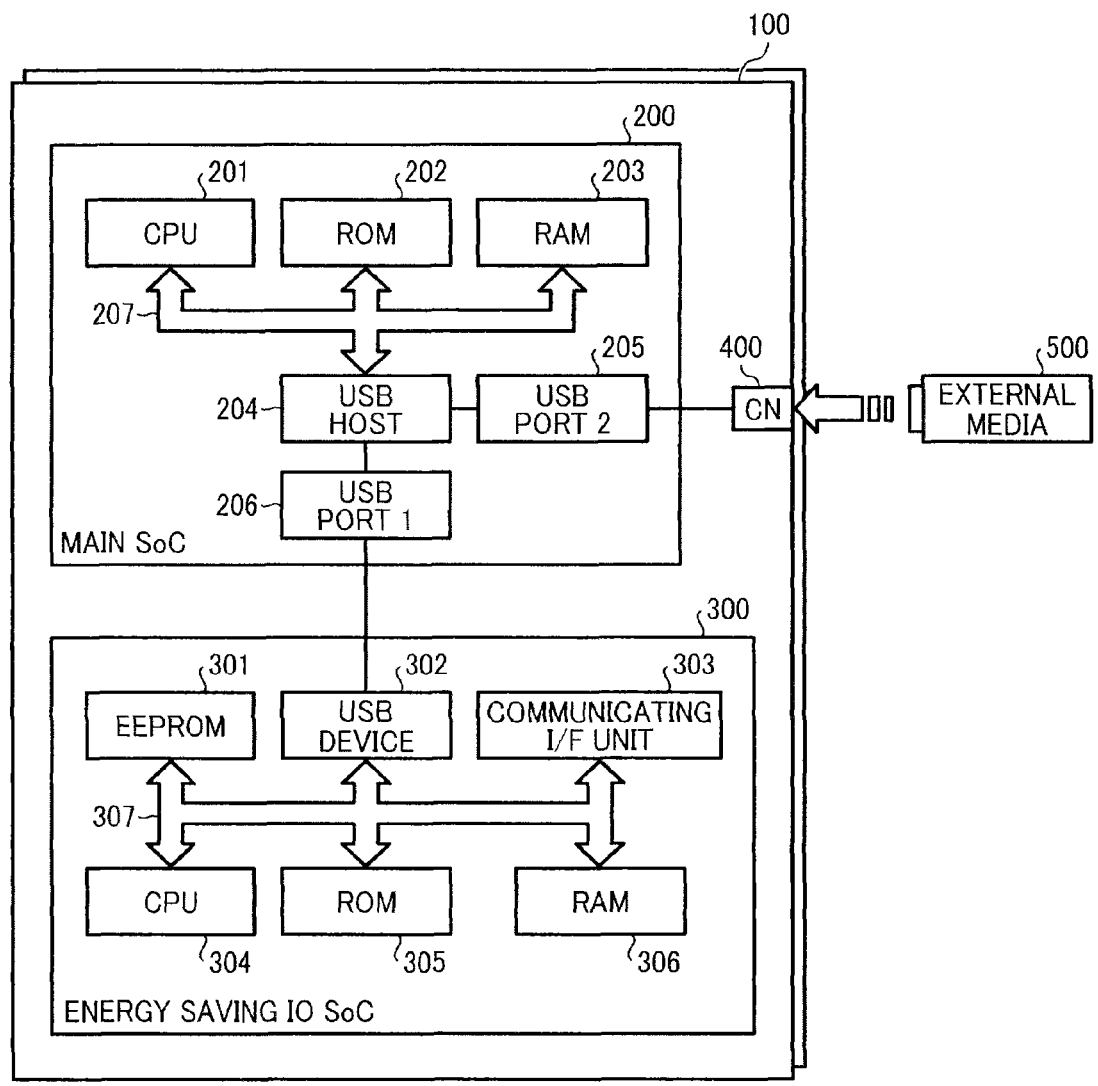
FIG. 1 is an overview of a hardware configuration of an output device as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings. In this embodiment, a description is given of an example of an output device in which a master SoC to which a removable medium is connected collects log information from all slave SoCs connected to the master SoC and stores the log information adding log information of the master SoC into the removable medium as a file only if a volume label name of the removable medium inserted into the output device is a predefined one.

FIG. 1 is an overview of a hardware configuration of an output device in this embodiment. In FIG. 1, an output device 100 consists of a main SoC 200 and an energy saving Input Output (IO) SoC 300. The main SoC 200 includes a USB host module 204. One port of the USB host module 204 (USB port 2 205) is connected to an external connector (CN) 400 and an external medium 500 such as a USB memory can be connected to the external CN 400.

The energy saving IO SoC 300 includes a communicating interface (I/F) unit and a USB device module 302, transfers data signals received from an external network (not shown in figures) to the main SoC 200 via USB port 1 206, and sends data transferred from the main SoC 200 via the USB port 1 206 to the external network.

Also, various settings (such as IP addresses) necessary for communicating via a network (not shown in figures) is stored in an Electrically Erasable Programmable Read Only Memory (EEPROM) 301 included in the energy saving IO SoC 300.

A Read Only Memory (ROM) 202 and 305 in each SoC stores a program to control the operation of the SoC, and a Central Processing Unit (CPU) (201, 304) executes the program in the ROM or executes a process by expanding the program in a Random Access Memory (RAM) if necessary. In the main SoC 200, the CPU 201, the ROM 202, the RAM 203, and the USB host 204 are communicably connected with each other via a bus 207. In the energy saving IO SoC 300, the EEPROM 301, the USB device 302, a communicating I/F unit 303, the CPU 304, the ROM 305, and the RAM 306 are communicably connected with each other via a bus 307.

The CPUs 201 and 304 in each SoC store processing information necessary for debugging as log information in the RAMs 203 an 306 in each SoC in binary format.

In the log collecting method on the output device of this embodiment, the SoC that includes the I/F (CN 400) for an external medium such as a USB memory operates as the master that controls processes of detecting the external medium 500, determining whether or not to acquire log information, collecting the log information, and storing the log information, and other SoCs operate as slaves that just transfer their log information in the SoC to the master in response to a request to acquire the log information from the master. Therefore, in the hardware configuration in FIG. 1, the main SoC 200 is regarded as the master, and the energy saving IO SoC 300 is regarded as the slave.

Also, in case an output device consists of more than three SoCs, this master/slave relationship still holds. In that case, if one SoC cannot communicate with the master SoC directly and log information in that SoC is also to be collected, another SoC that can communicate with that SoC relays communication between that SoC and the master SoC.

Figure 2:
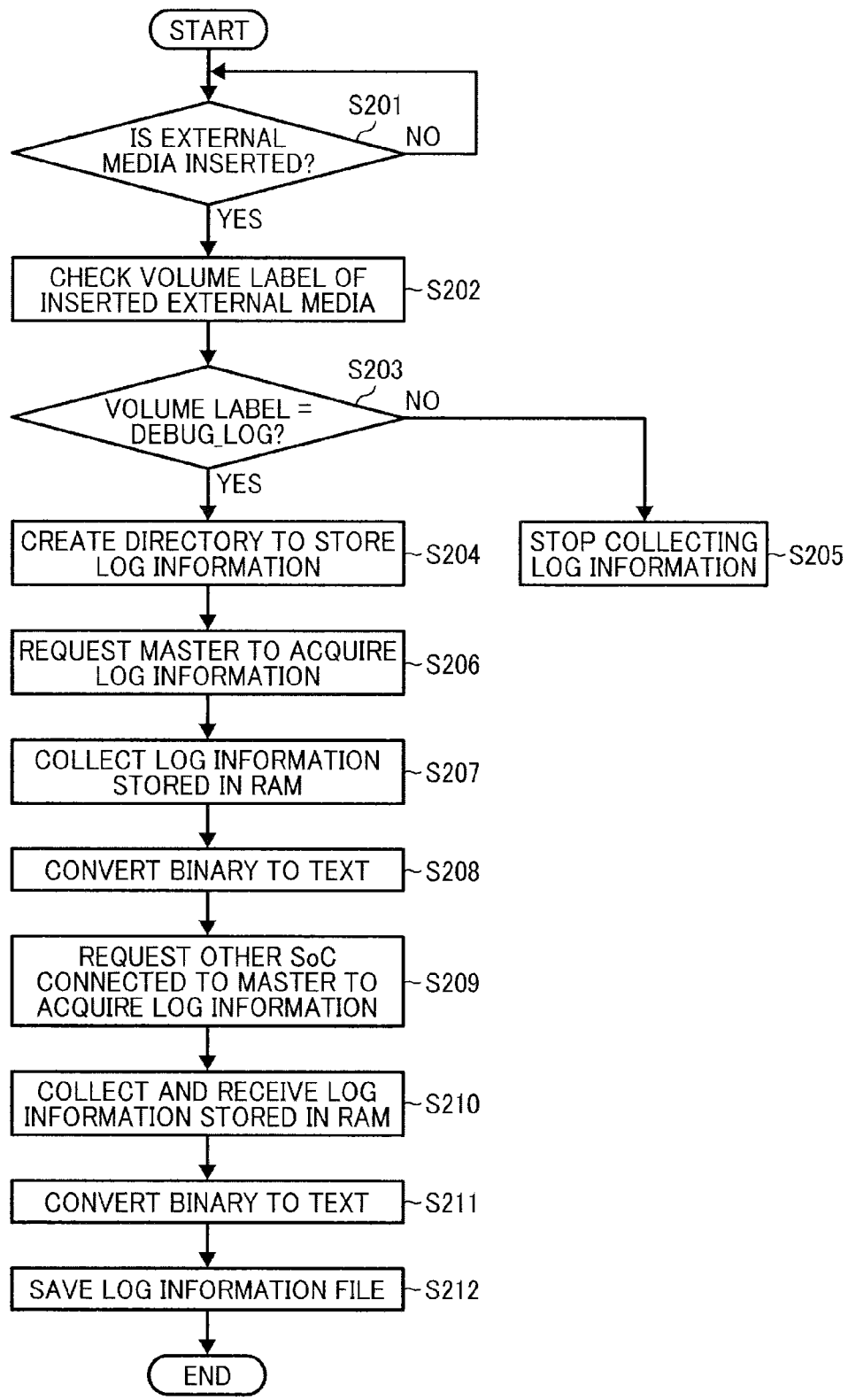
FIG. 2 is a flowchart illustrating collecting log information on a master SoC in the output device as an embodiment of the present invention.

Next, operation of the output device in this embodiment is described below with reference to FIG. 2. FIG. 2 is a flowchart illustrating collecting log information on the master SoC in the output device of this embodiment.

In FIG. 2, the USB host 204 determines whether or not the external medium 500 such as a USB memory is inserted into the CN 400 in step S201. If the USB host 204 determines that the external medium 500 has not been inserted into the CN 400 yet in S201 (NO in S201), the USB host 204 waits for the external medium 500 to be inserted. If the USB host 204 determines that the external medium 500 has been inserted into the CN 400 (YES in S201), the process proceeds to S202.

In S202, the USB host 204 checks a volume label of the external medium 500 inserted into the CN 400. The volume label is the name of a device or medium that stores data. In this case, it is assumed that the external medium 500 is formatted with the volume label "DEBUG_LOG". Also, in S203, the USB host 204 determines whether or not the volume label of the external medium 500 inserted into the CN 400 is "DEBUG_LOG."

In S203, if the USB host 204 determines that the volume label of the external medium 500 is not "DEBUG_LOG" (NO in S203), the process proceeds to S205 and the collection of log information is stopped. Alternatively, if the USB host 204 determines that the volume label of the external medium 500 is "DEBUG_LOG" (YES in S203), the process proceeds to S204.

In S204, the USB host 204 creates a directory to store log information. Subsequently, in S206, the USB host 204 requests the master, i.e. the main SoC 200 (FIG. 1), to acquire log information, and the process proceeds to S207.

In S207, the USB host 204 collects log information stored in the RAM 203 based on the volume label "DEBUG_LOG" Subsequently, in S208, the USB host 204 converts the binary data of the log information collected from the RAM 203 into text data.

Next, in step S209, the USB host 204 requests another SoC (the energy saving IO SoC 300) to acquire log information, and the process proceeds to S210. In S210, the USB host 204 collects log information stored in the RAM 306 and receives the log information.

Subsequently, in S211, the USB host 204 converts the binary data of the log information collected from the RAM 306 into text data, and the binary data of the main SoC 200 converted in S208 and the binary data of the energy saving IO SoC 300 converted in S211 are stored as a log information file in the external medium 500 via the USB port 2 205 in S212, after which the process finishes.

Although not shown in FIG. 2, if there is no response to the request to acquire log information even after a predetermined period of time passes when the USB host 204 requests the master or another SoC connected to the master to acquire log information, blank log information can be stored as a log information file.

Figure 3:
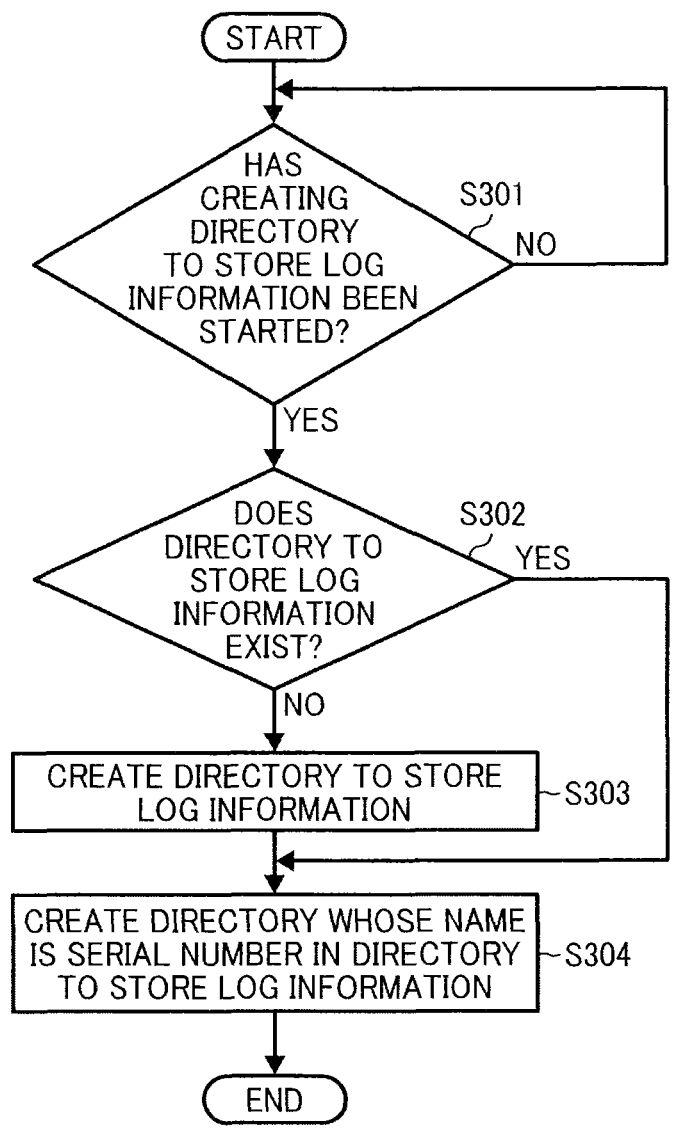
FIG. 3 is a flowchart illustrating creating a directory to store log on an external medium in the output device as an embodiment of the present invention.

Next, operation of the USB host 204 that creates a directory to store log information in the output device of this embodiment is described below with reference to FIG. 3. FIG. 3 is a flowchart illustrating creating a directory to store log information on the external medium with the output device in this embodiment.

In FIG. 3, first, the USB host 204 determines whether or not the creation of the directory to store log information has been started in S301. If the USB host 204 determines that the creation of the directory has not been started yet (NO in S301), the USB host 204 waits until the creation of the directory is started. If the USB host 204 determines that the creation of the directory has been started (YES in S301), the process proceeds to S302.

In S302, the USB host 204 determines whether or not the directory to store log information exists in the external medium 500. If the USB host 204 determines that the directory to store log information does not exist (NO in S302), the process proceeds to S303 and the USB host 204 creates a log information storing directory 330 in the external medium 500. That is, the fixed directory for storing log information is created in the external medium 500, and log information is stored in a folder below the directory.

Alternatively, if the USB host 204 determines that the log information storing directory already exists in the external medium (YES in S302), the process proceeds to S304. In S304, the USB host 204 creates a directory whose name is a serial number in the folder below the log information storing directory, and log information is stored in the created directory.

Figure 4:
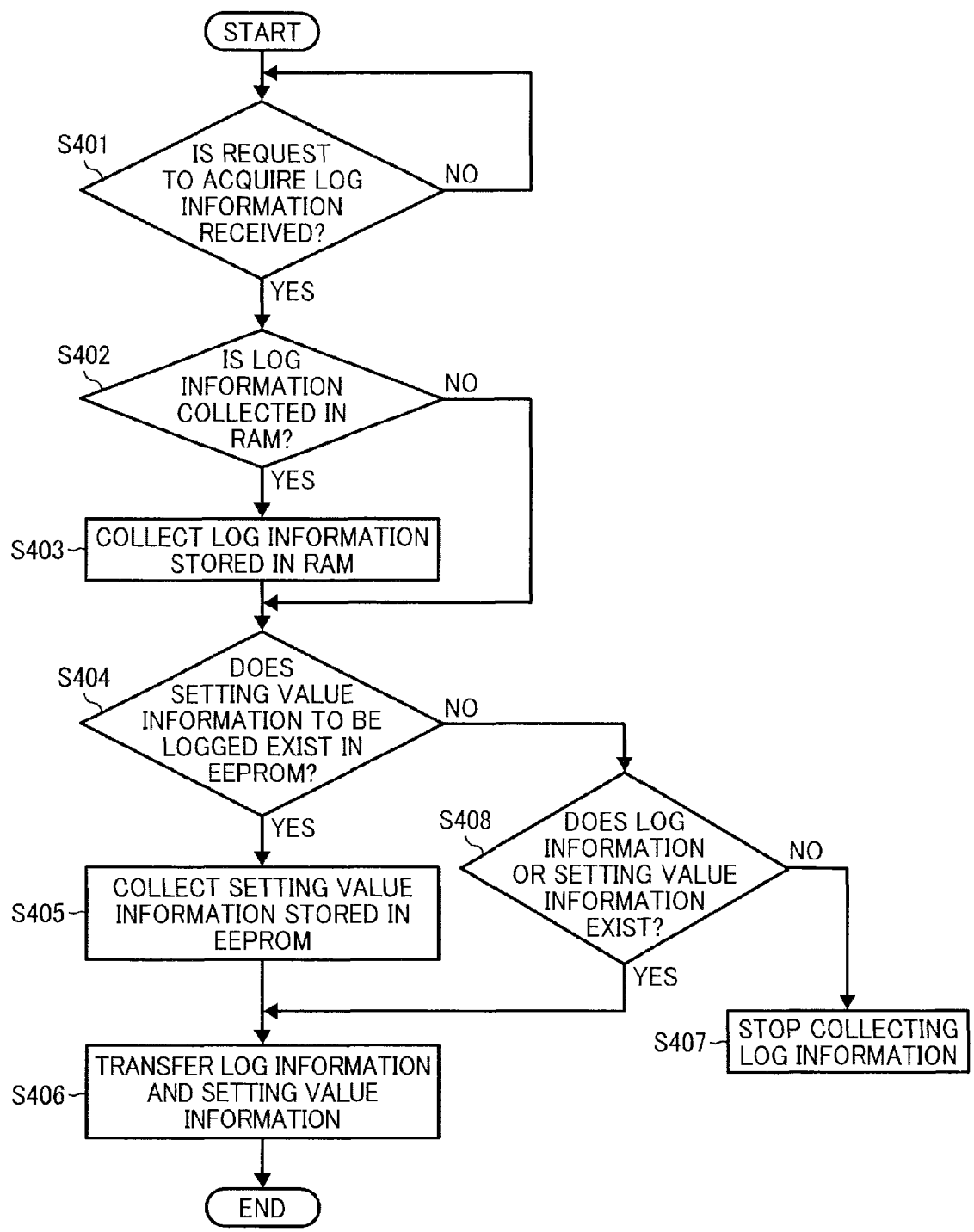
FIG. 4 is a flowchart illustrating collecting log information on a slave SoC in the output device as an embodiment of the present invention.

Next, operation of the USB host 204 that collects log information from the slave SoC in the output device of this embodiment is described below with reference to FIG. 4. FIG. 4 is a flowchart illustrating collecting log information on the slave SoC in the output device of this embodiment.

In FIG. 4, first, the CPU 304 determines whether or not a log information acquisition request has been received. If the CPU 304 determines that the log information acquisition request has been received (YES in S401), the process proceeds to S402. Alternatively, if the CPU 304 determines the log information acquisition request has not been received (NO in S401), the CPU 304 waits until the log information acquisition request is received.

In S402, the CPU 304 determines whether or not log information is stored in the RAM 306. If the CPU 304 determines that log information is stored in the RAM 306 (YES in S402), the process proceeds to S403. Alternatively, if the CPU 304 determines that log information is not stored in the RAM 306 (NO in S402), the process proceeds to S404.

In S403, the CPU 304 collects the log information stored in the RAM 306. Subsequently, in S404, the CPU 304 determines whether or not setting information to be logged exists in the EEPROM 301. If the CPU 304 determines that setting information of the output device exists in the EEPROM 301 (YES in S404), the process proceeds to S405. Alternatively, if the CPU 304 determines the setting information does not exist in the EEPROM 301 (NO in S404), the process proceeds to S408.

In S405, the CPU 304 collects the setting information of the output device stored in the EEPROM 301. Subsequently, in S406, the log information stored in the RAM 306 and the setting information stored in the EEPROM 301 are transferred to the external medium 500 via the USB device 302, the USB port 1, the USB host 204, and the USB port 2.

Also, in S404, if the CPU 304 determines that the setting information does not exist in the EEPROM 301 (NO in S404), the process proceeds to S408. In S408, the CPU 304 determines whether or not either the log information or the setting information exists. If the CPU 304 determines that at least one of the log information and the setting information exists (YES in S408), the process proceeds to S406. Alternatively, if the CPU 304 determines that neither the log information nor the setting information exists (NO in S408), the process proceeds to S407 and the log information (setting information) collecting process is stopped.

It should be noted that the setting information of the output device stored in the EEPROM 301 is collected in S405 if the CPU 304 determines that the log information exists in the EEPROM 301 (YES in S404) in S406 as shown in FIG. 4, and this is based on the fact that the energy saving IO SoC is equipped with the EEPROM 301. Therefore, the process flow of S404 and S405 is not always executed as shown in FIG. 4 depending on which SoC is equipped with the EEPROM that stores the setting information.

Also, since debug log information of all SoCs in the output device is collected as the log information described above, secret information such as password and access key of the output device is not collected.

It should be noted that each operating flow of the output device in this embodiment shown in FIG. 2, FIG. 3, and FIG. 4 can be executed by a program on a computer. That is, the CPU 201 and the CPU 304 in FIG. 1 may load a program stored in storage devices such as the ROM 202 and the ROM 305 and sequentially execute processing steps of the program.

As described above, regarding collecting log information of the output device, especially in case a failure occurs in the output device, the present invention enables log information to be acquired to analyze the cause of the failure. That is, only if the volume label of the removable medium inserted into the output device is a predefined one does the master SoC to which the removable medium is connected collect log information from each SoC connected to the master SoC and store the log information in addition to the log information of the master SoC itself to the removable medium as a file. Thus, log information of all SoCs in the output device can be acquired en bloc without using dedicated tools and requiring specified UI operations, and without having much effect on existing functions of the output device.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An output device, comprising:
   a detector to detect that a storage device formatted with a predefined volume label is connected to the output device;
   a reading unit to read log information of the output device based on the same volume label as the predefined volume label after the detector detects that the storage device is connected;
   a writing unit to write the log information read by the reading unit to the storage device; and
   a plurality of communicably connected System on Chips, wherein a System on Chip to which the storage device is connected functions as a master System on Chip and a System on Chip connected to the storage device via the master System on Chip functions as a slave System on Chip, and log information of the master System on Chip is written to the storage device and log information of the slave System on Chip is written to the storage device via the master System on Chip in response to a request from the master System on Chip to acquire log information.

2. The output device according to claim 1, wherein the log information is written to a directory to store the log information created on the storage device.

3. The output device according to claim 1, wherein setting information of the output device is also written to a directory to store the log information in addition to the log information.

4. A method of collecting log information on an output device, comprising the steps of:
   detecting that a storage device formatted with a predefined volume label is connected to the output device;
   reading log information based on the same volume label as the predefined volume label after detecting that the storage device is connected in the detecting step; and
   writing the log information of a master System on Chip to the storage device which is connected to the master System on Chip and writing log information of a slave System on Chip to the storage device via the master System on chip, in response to a request from the master System on Chip to acquire log information.

5. A non-transitory computer-readable storage medium storing a program that, when executed by a computer, causes the computer to implement a method of collecting log information on an output device, the method comprising the steps of:
   detecting that a storage device formatted with a predefined volume label is connected to the output device;
   reading log information based on the same volume label as the predefined volume label after detecting that the storage device is connected in the detecting step; and
   writing the log information of a master System on Chip to the storage device which is connected to the master System on Chip and writing log information of a slave System on Chip to the storage device via the master System on chip, in response to a request from the master System on Chip to acquire log information.

* * * * *